3,452,031
AMINOALKYLCARBAMATE ESTERS
Robert Ford Parcell, Ann Arbor, Mich., assignor to Parke, Davis & Company, Detroit, Mich., a corporation of Michigan
No Drawing. Continuation-in-part of application Ser. No. 451,004, Apr. 26, 1965. This application July 21, 1967, Ser. No. 654,999
Int. Cl. C07c *101/24*
U.S. Cl. 260—294.3   6 Claims

ABSTRACT OF THE DISCLOSURE

Methyl, ethyl, and benzyl amino-$(CH_2)_n$-carbamate esters, in which the amino group is tert-butylamino, N-methyl-tert-butylamino, tert-amylamino, N-methyl-tert-amylamino, 3-methyl-3-pentylamino, N-methyl-(3-methyl-3-pentyl)-amino, or 2,6-dimethylpiperidino, and in which the carbamate nitrogen is optionally substituted by methyl and $n$ is 4 or 5, useful as pharmacological agents exhibiting anti-hypertensive activity. The secondary and heterocyclic aminoalkylcarbamate esters are produced by reacting an appropriately substituted aminoalkylamine with a methyl, ethyl, or benzyl chloro(or bromo)-formate, and the tertiary aminoalkylcarbamate esters are produced by reacting one of the secondary aminoalkylcarbamate esters with formaldehyde and formic acid to methylate the amino nitrogen.

---

This application is a continuation-in-part of copending application Ser. No. 451,004, filed Apr. 26, 1965, now abandoned.

SUMMARY AND DETAILED DESCRIPTION

The present invention relates to new carbamate ester compounds that are useful as pharmacological agents and to methods for their production. More particularly, the invention relates to new aminoalkylcarbamate ester compounds, having in the free base form the formula,

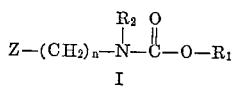

I and to pharmaceutically-acceptable salts thereof, where $R_1$ is methyl, ethyl, or benzyl; $R_2$ is hydrogen or methyl; $n$ is 4 or 5; and Z is tert-butylamino, N-methyl-tert-butylamino, tert-amylamino, N-methyl-tert-amylamino, 3-methyl-3-pentylamino, N-methyl-(3-methyl - 3 - pentyl) amino, or 2,6-dimethylpiperidino.

In accordance with the invention, aminoalkylcarbamate ester compounds, having the formula,

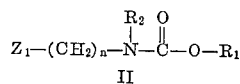

II and acid-addition salts thereof are produced by reacting an aminoalkylamine compound, having the formula,

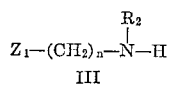

III with a haloformate ester, having the formula

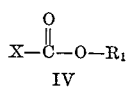

IV in a non-reactive solvent medium; where $R_1$, $R_2$, and $n$ are as defined previously; X is bromine or chlorine, preferably chlorine; and $Z_1$ is tert-butylamino, tert-amylamino, 3-methyl - 3 - pentylamino, or 2,6-dimethylpiperidino. A wide variety of solvents may be employed in this reaction, including aromatic and aliphatic hydrocarbons, such as benzene, toluene, n-hexane, and isooctane; ethers, such as diethyl ether and tetrahydrofuran; chlorinated hydrocarbons, such as carbon tetrachloride, chloroform, methylene chloride, and ethylene chloride; tertiary amides, such as N,N-dimethylformamide, N,N-dimethylacetamide, and N-methyl - 2 - pyrrolidone; dimethylsulfoxide; as well as mixtures of these. The preferred solvents are the chlorinated hydrocarbons. The temperature and duration of the reaction are not critical and may be varied within wide limits. The reaction is normally carried out at room temperature and is essentially complete within a period of several minuites to one hour. Equivalent quantities of reactants may be employed. To insure completeness of reaction, however, it is desirable to use a slight excess of the haloformate ester. The product of the reaction may be isolated directly as a hydrohalide acid-addition salt, or, following treatment of the reaction mixture with base, as the free base. The isolated free base can then be converted into other acid-addition salts by reaction with any of a variety of organic or inorganic acids.

The aminoalkylamine compounds having Formula III above, that are used as starting materials in the foregoing process, are prepared in a number of ways. The primary aminoalkylamine compounds, having the formula $$Z_1—(CH_2)_n—NH_2$$

V are prepared by reacting an amine, having the formula

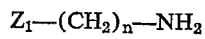

VI with a halonitrile compound, having the formula

VII in the presence of a base, followed by reacting the intermediate aminoalkylnitrile compound obtained, having the formula

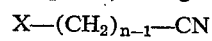

VIII with a suitable reducing agent, such as lithium aluminum hydride, and hydrolyzing the reaction product. The secondary aminoalkylamine compounds, having the formula

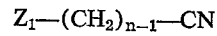

IX are prepared by reacting a primary amine compound having Formula V above with a formate ester, followed by reacting the intermediate formylamino compound obtained, having the formula

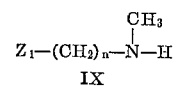

X with lithium aluminum hydride and hydrolyzing the reaction product. The secondary aminoalkylamine compounds may also be prepared by the lithium aluminum hydride reduction of an aminoalkyl carbamate ester compound, having the formula

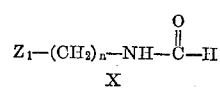

XI

In the foregoing Formulas V–XI, $R_1$, $n$, X, and $Z_1$ are as defined earlier.

Also in accordance with the invention, aminoalkylcarbamate ester compounds, having the formula,

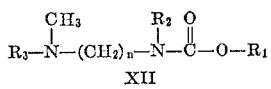
XII and acid-addition salts thereof are produced by the reaction of an aminoalkylcarbamate ester compound, having the formula,

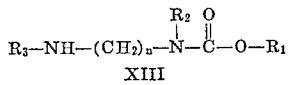
XIII with formaldehyde in the presence of formic acid; where $R_1$, $R_2$, and $n$ are as defined earlier and $R_3$ is tert-butyl, tert-amyl, or 3-methyl-3-pentyl. While equimolar quantities of formaldehyde and the aminoalkylcarbamate ester starting material may be employed in this reaction, it is preferable to use a moderate excess of formaldehyde to insure complete reaction. At least two moles of formic acid are required per mole of aminoalkylcarbamate ester starting material. In normal practice, a considerable excess of formic acid is used, both to insure complete reaction and for solvent purposes. Additional solvent is neither required nor desirable. The temperature and duration of the reaction are not critical and may be varied. The reaction is preferably carried out at the reflux temperature (90–100° C.) for a period of from 2 to 8 hours. The product of the reaction may be isolated directly as a formate salt, or following treatment of the reaction mixture with a base, as the free base. The free base can then be converted to other acid-addition salts by reaction with any of a variety of organic or inorganic acids.

The compounds of the invention can exist in the free base form having Formula I or in the form of an acid-addition salt formed with any of a variety of organic or inorganic acids. The acid-addition salts envisioned by and included in this invention may be obtained directly from the reactions described above or by reacting the selected free base with the selected acid in an unreactive solvent medium. Some representative pharmaceutically-acceptable acid-addition salts are the hydrochloride, hydrobromide, hydroiodide, sulfate, phosphate, nitrate, formate, acetate, citrate, tartrate, salicylate, benzoate, and benzenesulfonate. The preferred salts, because of their ease of preparation, are the hydrochloride and hydrobromide salts. The acid-addition salts can be converted to the corresponding free base by reaction with a base, such as an alkali metal hydroxide or alkali metal carbonate. The acid-addition salts differ in solubility properties from the free bases, but are otherwise equivalent for purposes of the invention.

The compounds of the invention are useful as pharmacological agents, especially as antihypertensive agents, that may be administered either orally or parenterally, with oral administration preferred. Their antihypertensive activity is demonstrable and quantitatively measurable by means of a test that involves the use of hypertensive perinephritic rats. This test, which has been described by Chen et al., The Journal of Pharmacology and Experimental Therapeutics, vol. 143, No. 3, March 1964, p. 374, has been found to be a reliable indicator of antihypertensive activity, as demonstrated, for example, for the known clinically useful agent, guanethidine. When applied to the compounds of the invention, the test was modified slightly in that the blood pressure of the rats was measured by means of a tail plethysmograph and the lowering effect of the test compounds on the blood pressure was expressed as the percentage return of the pressure from the hypertensive level to the average normal value of the control animals. The average of the percentage return was rated as follows: 25–30%, 1+; 30–50%, 2+; 50–75%, 3+; 75–100%, 4+. When tested by this method at a dose level of 2.5 mg./kg., the compound of Example 2, ethyl [4-(tert-butylamino)butyl]carbamate hydrochloride, had an activity rating of 4+.

The invention is illustrated by the following examples.

EXAMPLE 1

To a stirred solution of 14.4 g. of 4-(tert-butylamino)butylamine in 300 ml. of methylene chloride at room temperature is added a solution of 10.0 g. of methyl chloroformate in 200 ml. of methylene chloride. The resulting solution is then evaporated to dryness, and the solid methyl [4-(tert-butylamino)butyl]carbamate hydrochloride obtained is isolated and crystallized from isopropyl alcohol-ether; M.P. 164–165° C.

The free base can be obtained as follows. An aqueous solution of the hydrochloride salt is made slightly alkaline with sodium hydroxide, the alkaline solution is extracted with ether, the ethereal extract is dried and evaporated to dryness, and the methyl [4-(tert-butylamino)butyl]carbamate obtained is purified by distillation.

The citrate salt of methyl [4-(tert-butylamino)butyl]carbamate can be prepared by treating a solution of 6.06 g. of the free base in 50 ml. of methanol with a solution of 2.1 g. of citric acid monohydrate in 30 ml. of methanol, evaporating the resulting mixture to dryness under reduced pressure, and isolating the salt obtained.

EXAMPLE 2

To a stirred solution of 14.4 g. of 4-(tert-butylamino)butylamine in 600 ml. of methylene chloride at room temperature is added a solution of 11.0 g. of ethyl chloroformate in 400 ml. of methylene chloride. The resulting solution is then evaporated to dryness, and the solid residue of ethyl [4-(tert-butylamino)butyl]carbamate hydrochloride is triturated with ether, isolated, and crystallized from isopropyl alcohol-ether; M.P. 124–127° C.

In the foregoing procedure, with the substitution of 15.5 g. of ethyl bromoformate for the ethyl chloroformate, there is obtained ethyl [4-(tert-butylamino)butyl]carbamate hydrobromide.

The free base is obtained as follows. An aqueous solution of the hydrochloride salt is made slightly alkaline with sodium hydroxide, the alkaline solution is extracted with ether, the ethereal extract is dried and evaporated to dryness, and the residue of ethyl [4-(tert-butylamino)butyl]carbamate that is obtained is purified by distillation; B.P. 95–100° C./0.25 mm. Hg.

The acetate salt of ethyl [4-(tert-butylamino)butyl]carbamate can be obtained by treating a methanolic solution of the free base with a slight excess of acetic acid, concentrating the resulting mixture, and isolating the precipitated salt by filtration.

EXAMPLE 3

To a solution of 21.5 g. of N-methyl-[14-(tert-butylamino)butyl]amine in 400 ml. of methylene chloride at −20° C. is added slowly a solution of 16.0 g. of methyl chloroformate in 250 ml. of methylene chloride. The solution is then stirred at room temperature for 40 minutes and evaporated to dryness. The solid residue of methyl N-methyl-[4-(tert-butylamino)butyl]carbamate hydrochloride is triturated with ether, isolated, and crystallized from isopropyl alcohol-ether; M.P. 170–172° C.

The N-methyl-[4-(tert-butylamino)butyl]amine used as starting material in the foregoing procedure is prepared as follows. A solution of 75 g. of ethyl [4-(tert-butylamino)butyl]carbamate in 500 ml. of anhydrous ether is added to a well-stirred slurry of 38 g. of lithium aluminum hydride in 2,000 ml. of ether, and the resulting mixture is stirred for 16 hours at room temperature. The mixture is then hydrolyzed by the stepwise addition of 40 ml. of water, 30 ml. of 40% aqueous sodium hydroxide, and 140 ml. of water. The aqueous mixture is filtered to remove inorganic solids, the filtrate is evaporated, and the residue of N-methyl-[4-(tert-butylamino)butyl]amine obtained is purified by distillation; B.P. 92–93° C./17 mm. Hg.

EXAMPLE 4

To a stirred solution of 17 g. of 4-(tert-butylamino) butylamine in 500 ml. of methylene chloride at room temperature is slowly added 67 g. of a 30% solution of benzyl chloroformate in toluene. The resulting mixture is then evaporated to dryness, and the solid residue of benzyl [4-(tert-butylamino)butyl]carbamate hydrochloride is triturated with ether, isolated, and crystallized from isopropyl alcohol-ether; M.P. 111–112° C.

EXAMPLE 5

A solution of 9.5 g. of methyl chloroformate in 100 ml. of methylene chloride is slowly added to a stirred solution of 15.8 g. of 5-(tert-butylamino)pentylamine in 350 ml. of methylene chloride while maintaining the temperature at 25–30° C. The resulting solution is then evaporated, and the residue of methyl [5-(tert-butylamino) pentyl]carbamate hydrochloride is triturated with ether, isolated, and crystallized from isopropyl alcohol-ether; M.P. 135–136° C.

In the foregoing procedure, with the substitution of 15.5 g. of ethyl bromoformate for the methyl chloroformate, there is obtained ethyl [5-(tert-butylamino) pentyl]carbamate hydrobromide.

The 5-(tert-butylamino)pentylamine used as starting material is prepared as follows. A mixture consisting of 162 g. of 5-bromovaleronitrile, 182 g. of tert-butylamine, and 750 ml. of benzene is stirred and heated under reflux for 28 hours. After cooling, the mixture is filtered, and the filtrate is washed with cold, dilute aqueous sodium hydroxide and with water, then dried and evaporated. The residue obtained is distilled to give pure 5-(tert-butylamino)valeronitrile; B.P. 117–120° C./16 mm. Hg. A solution of 119 g. of 5-(tert-butylamino)valeronitrile in 500 ml. of ether is carefully added to a slurry of 44 g. of lithium aluminum hydride in 1,500 ml. of ether, the mixture is stirred and heated under reflux for 2 hours, and is then hydrolyzed by the stepwise addition of 46 ml. of water, 36 ml. of 40% aqueous sodium hydroxide, and 160 ml. of water. The aqueous mixture is filtered, the filtrate is evaporated, and the residue of 5-(tert-butylamino)pentylamine is purified by distillation; B.P. 98–101° C./16 mm. Hg.

EXAMPLE 6

A solution of 11 g. of methyl chloroformate in 100 ml. of methylene chloride is added with stirring at room temperature to a solution of 16 g. of 4-(tert-amylamino)butylamine in 300 ml. of methylene chloride. The resulting solution is then evaporated, and the solid residue of methyl [4-(tert-amylamino)butyl]carbamate hydrochloride is triturated with ether, isolated, and crystallized from isopropyl alcohol-ether; M.P. 153–155° C.

In the foregoing procedure, with the substitution of 12 g. of ethyl chloroformate for the methyl chloroformate, there is obtained ethyl [4-(tert-amylamino)butyl]carbamate hydrochloride; M.P. 132–133° C., following crystallization from isopropyl alcohol-ether.

The 4-(tert-amylamino)butylamine used as starting material is prepared as follows. A mixture consisting of 100 g. of tert-amylamine, 170 g. of 4-bromobutyronitrile, 400 g. of potassium carbonate, and 800 ml. of acetonitrile is stirred and heated under reflux for 22 hours. The solid precipitate is removed by filtration and washed with ether. The combined filtrate and ether wash are evaporated, and the residue obtained is dissolved in ether. The ethereal solution is washed with dilute aqueous sodium hydroxide and extracted with dilute aqueous hydrochloric acid. The acid extract is made alkaline with aqueous sodium hydroxide, the alkaline mixture is extracted with ether, and the ethereal extract is dried and evaporated to give 4-(tert-amylamino)-butyronitrile, purified by distillation; B.P. 118–122° C./17 mm. Hg. This product (122 g.) is reduced by reaction with 40 g. of lithium aluminum hydride to give 4-(tert-amylamino)butylamine; B.P. 100–104° C./17 mm. Hg, following the procedure described in Example 5 above for the reduction of 5-(tert-butylamino) valeronitrile.

EXAMPLE 7

A solution of 2.2 g. of ethyl chloroformate in 25 ml. of methylene chloride is added at room temperature to a solution of 3.0 g. of 4-(3-methyl-3-pentylamino)butylamine in 50 ml. of methylene chloride. The resulting solution is then evaporated, and the solid residue of ethyl [4-(3-methyl-3-pentylamino)butyl]carbamate hydrochloride is triturated with ether, isolated, and crystallized from isopropyl alcohol-ether; M.P. 132–134° C.

The 4-(3-methyl-3-pentylamino)butylamine used as starting material in the foregoing procedure is prepared according to the procedure described in Example 5 above for the preparation of 5-(tert-butylamino)pentylamine by first reacting a mixture consisting of 27 g. of 3-methyl-3-pentylamine, 39.6 g. of 4-bromobutyronitrile, 76 g. of potassium carbonate, and 200 ml. of diethyl ketone to obtain 4-(3-methyl-3-pentylamino)butyronitrile, B.P. 126–128° C./14 mm. Hg, and then reducing this nitrile compound (33 g.) by reaction with 19 g. of lithium aluminum hydride in anhydrous ether. The pure 4-(3-methyl-3-pentylamino)butylamine distills at 127–139° C./23 mm. Hg.

EXAMPLE 8

A solution of 10.5 g. of methyl chloroformate in 100 ml. of methylene chloride is added at room temperature to a stirred solution of 18 g. of 4-(2,6-dimethylpiperidino)-butylamine in 300 ml. of methylene chloride. The resulting solution is then evaporated on a steam bath, and the residue is dissolved in water. The aqueous solution is extracted with ether, made basic with aqueous sodium hydroxide, and the basic solution is extracted with ether. The ethereal extract is washed with water, dried, and evaporated to give methyl [4-(2,6-dimethylpiperidino) butyl]carbamate, purified by distillation; B.P. 109° C./0.1 mm. Hg.

By utilizing the foregoing procedure, from the reaction of 17 g. of ethyl chloroformate and 25 g. of 4-(2,6-dimethylpiperidino)butylamine, there is obtained ethyl [4-(2,6-dimethylpiperidino)butyl]carbamate; B.P. 113° C./0.1 mm. Hg.

The 4-(2,6-dimethylpiperidino)butylamine used as starting material in the foregoing procedure is prepared as follows. A mixture consisting of 148 g. of 4-bromobutyronitrile, 226 g. of 2,6-dimethylpiperidine, and 400 ml. of toluene is stirred and heated under reflux for 12 hours. The cooled mixture is washed with water to remove piperidine hydrobromide, and then extracted with 750 ml. of cold 5% hydrochloric acid. The acidic aqueous solution is made alkaline with cold aqueous sodium hydroxide, the alkaline mixture is extracted with ether, and the ethereal solution is washed with water, dried, and evaporated to give 4-(2,6-dimethylpiperidino)butyronitrile; B.P. 145–148° C./16 mm. Hg. A solution of 121 g. of 4-(2,6-dimethylpiperidino)butyronitrile in 500 ml. of ether is carefully added to a slurry of 25.5 g. of lithium aluminum hydride in 1,000 ml. of ether, the mixture is stirred and heated under reflux for 2 hours, and is then hydrolyzed by the stepwise addition of 27 ml. of water, 20 ml. of 40% aqueous sodium hydroxide, and 94 ml. of water. The aqueous mixture is filtered, the filtrate is evaporated, and the residue of 4-(2,6-dimethylpiperidino)butylamine is purified by distillation; B.P. 130–134° C./16 mm. Hg.

EXAMPLE 9

A solution of 18.5 g. of methyl chloroformate in 200 ml. of methylene chloride is added at room temperature to a stirred solution of 33 g. of N-methyl-[4-(2,6-dimethylpiperidino)butyl]amine in 400 ml. of methylene chloride. The resulting solution is then evaporated on a steam bath, and the residue is dissolved in water. The aqueous solution is extracted with ether, made basic with aqueous sodium hydroxide, and the basic mixture is extracted with ether. The ethereal extract is washed with water, dried, and evaporated to give methyl N-methyl[4-(2,6-dimethylpiperidino)butyl]carbamate, purified by distillation; B.P. 91° C./0.1 mm. Hg.

By utilizing the foregoing procedure, with the substitution of 19.5 g. of ethyl chloroformate for the methyl chloroformate, there is obtained ethyl N-methyl-[4-(2,6-dimethylpiperidino)butyl]carbamate; B.P. 98° C./0.1 mm. Hg.

The N-methyl-[4-(2,6-dimethylpiperidino)butyl]amine used as starting material in the above procedure is prepared as follows. A solution of 74. g of 4-(2,6-dimethylpiperidino)butylamine in 200 ml. of ethyl formate is kept at room temperature for 16 hours, concentrated on a steam bath, and the residue of 1-(4-formylaminobutyl)-2,6-dimethylpiperidine is purified by distillation; B.P. 133–135° C./0.15 mm. Hg.

A solution of 79 g. of 1-(4-formylaminobutyl)-2,6-dimethylpiperidine in 500 ml. of ether is added to a well-stirred slurry of 19 g. of lithium aluminum hydride in 1000 ml. of ether, and the resulting mixture is stirred for 16 hours at room temperature. The mixture is then hydrolyzed by the stepwise addition of 20 ml. of water, 15 ml. of 40% aqueous sodium hydroxide, and 70 ml. of water. The aqueous mixture is filtered, the filtrate is evaporated, and the residue of N-methyl-[4-(2,6-dimethylpiperidino)butyl]amine is purified by distillation; B.P. 131–134° C./16 mm. Hg.

EXAMPLE 10

A solution of 18.0 g. of ethyl chloroformate in 100 ml. of methylene chloride is added at room temperature with stirring to a solution of 30.0 g. of 5-(2,6-dimethylpiperidino)pentylamine in 400 ml. of methylene chloride. The resulting solution is then evaporated to dryness, and the solid residue of ethyl [5-(2,6-dimethylpiperindino)pentyl]carbamate hydrochloride is triturated with ether, isolated, and crystallized from isopropyl alcohol-ether; M.P. 129–130° C.

The 5-(2,6-dimethylpiperidino)pentylamine used as starting material in the foregoing procedure is prepared according to the procedure described in Example 8 above for the preparation of 4-(2,6-dimethylpiperidino)butylamine by first reacting 162 g. of 5-bromovaleronitrile and 226 g. of 2,6-dimethylpiperidine to obtain 5-(2,6-dimethylpiperidino)-valeronitrile, B.P. 164–166° C./20 mm. Hg, and then reducing this nitrile compound (97 g.) by reaction with 38.4 g. of lithium aluminum hydride. The pure 5-(2,6-dimethylpiperidino)pentylamine distills at 86–88° C./0.25 mm. Hg.

EXAMPLE 11

A mixture consisting of 21.6 g. of ethyl [4-(tert-butylamino)butyl]carbamate, 10 ml. of 40% aqueous formaldehyde, and 25 ml. of formic acid is heated at 90–100° C. for 4 hours. The solution is made basic with cold 50% aqueous sodium hydroxide and extracted with ether. The ether extract is washed with dilute aqueous sodium hydroxide and with water, then dried and evaporated to give ethyl [4 - (N - methyl-tert-butylamino)butyl]carbamate, purified by distillation; B.P. 91.5° C./0.15 mm. Hg.

By utilizing the foregoing procedure, the following aminoalkylcarbamate ester compounds can be obtained from the reaction of the designated carbamate ester starting material with the mixture of formaldehyde and formic acid:

(a) From the reaction of 21.6 g. of methyl [4-(tert-amylamino)butyl]carbamate there is obtained methyl [4-(N-methyl-tert-amylamino)butyl]carbamate.

(b) From the reaction of 24.4 g. of ethyl [4-(3-methyl-3-pentylamino)butyl]carbamate there is obtained ethyl [4-(N-methyl-3-methyl-3-pentylamino)butyl]carbamate.

The hydrochloride salt of ethyl [4-(N-methyl-tert-butylamino)butyl]carbamate can be obtained by treating an ethereal solution of the free base with a slight excess of anhydrous hydrogen chloride, concentrating the mixture, and isolating the salt obtained.

The citrate salt of ethyl [4-(N-methyl-tert-butyl-amino)butyl]carbamate can be obtained by treating a solution of 6.9 g. of the free base in 50 ml. of methanol with a solution of 2.1 g. of citric acid monohydrate in 30 ml. of methanol, evaporating the resulting mixture to dryness under reduced pressure, and isolating the salt obtained.

I claim:

1. A member of the class consisting of amino-alkylcarbamate ester compounds having in the free base form the formula

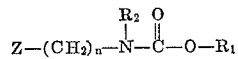

and pharmaceutically-acceptable salts thereof; where $R_1$ is a member of the class consisting of methyl, ethyl, and benzyl; $R_2$ is a member of the class consisting of hydrogen and methyl; $n$ is a positive integer greater than 3 and less than 6; and Z is a member of the class consisting of tert-butylamino, N-methyl-tert-butylamino, tert-amylamino, N-methyl-tert-amylamino, 3-methyl-3-pentylamino, N-methyl-(3-methyl-3-pentyl)amino, and 2,6-dimethylpiperidino.

2. Methyl [4-(tert-butylamino)butyl]carbamate hydrochloride.

3. Ethyl [4-(tert-butylamino)butyl]carbamate.

4. Methyl [4-(2,6-dimethylpiperidino)butyl]carbamate.

5. Ethyl [4-(2,6-dimethylpiperidino)butyl]carbamate.

6. Methyl N-methyl-[4-(2,6-dimethylpiperidino)butyl]carbamate.

References Cited

UNITED STATES PATENTS 3,163,536  12/1964  Nishio et al. _____ 96—107

HENRY R. JILES, *Primary Examiner.*

U.S. Cl. X.R.

260—482, 999